United States Patent
Zill et al.

(10) Patent No.: US 8,155,662 B2
(45) Date of Patent: Apr. 10, 2012

(54) SELF-CONFIGURING WIRELESS NETWORK LOCATION SYSTEM

(75) Inventors: Brian D. Zill, Bellevue, WA (US);
Alastair Wolman, Seattle, WA (US);
Jitendra D. Padhye, Redmond, WA (US); Paramvir Bahl, Sammamish, WA (US); Ranveer Chandra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 11/753,536

(22) Filed: May 24, 2007

(65) Prior Publication Data

US 2008/0200181 A1 Aug. 21, 2008

Related U.S. Application Data

(60) Provisional application No. 60/890,614, filed on Feb. 19, 2007.

(51) Int. Cl.
*H04W 24/00* (2009.01)
*H04W 4/00* (2009.01)
(52) U.S. Cl. .................. 455/456.1; 455/456.5; 455/423; 455/424
(58) Field of Classification Search ............... 455/435.1, 455/456.1, 456.2, 456.3, 456.6, 67.11, 445; 370/328, 310, 241; 702/186; 726/23
See application file for complete search history.

(56) References Cited

U.S. PATENT DOCUMENTS

| | | | |
|---|---|---|---|
| 5,054,111 A | 10/1991 | Goodwin | |
| 5,526,357 A | 6/1996 | Jandrell | |
| 6,088,588 A | 7/2000 | Osborne | |
| 6,249,252 B1 | 6/2001 | Dupray | |
| 6,782,256 B2 | 8/2004 | Engholm et al. | |
| 6,782,351 B2 | 8/2004 | Reichel et al. | |
| 6,957,067 B1 | 10/2005 | Iyer et al. | |
| 7,000,015 B2 | 2/2006 | Moore et al. | |
| 7,030,811 B2 | 4/2006 | Goren et al. | |
| 7,035,652 B1 | 4/2006 | Kelkar | |
| 7,110,779 B2 | 9/2006 | Billhartz et al. | |
| 7,113,794 B2 * | 9/2006 | Annamalai | 455/456.1 |
| 7,120,420 B2 | 10/2006 | Karaoguz et al. | |
| 7,236,460 B2 | 6/2007 | Wu et al. | |
| 7,286,515 B2 | 10/2007 | Olson et al. | |

(Continued)

FOREIGN PATENT DOCUMENTS

EP 1569490 8/2005

OTHER PUBLICATIONS

Layland, "Understanding Wi-Fi Performance," Business Communications Review, Mar. 2004, pp. 34-37.

(Continued)

*Primary Examiner* — Lester Kincaid
*Assistant Examiner* — Kuo Woo
(74) *Attorney, Agent, or Firm* — Lee & Hayes, PLLC

(57) ABSTRACT

Wireless adapters are installed on one or more general purpose computing devices and are connected via a network in an enterprise environment. The adapters are densely deployed at known locations throughout the environment and are configured as air monitors. The air monitors monitor signals transmitted by one or more transceiver devices and records information about these signals. One or more analysis or inference engines may be deployed to obtain the recorded signal information and the air monitor locations to determine a location of the one or more wireless transceivers devices deployed in the environment.

20 Claims, 8 Drawing Sheets

U.S. PATENT DOCUMENTS

| | | | |
|---|---|---|---|
| 7,295,524 | B1 | 11/2007 | Gray et al. |
| 7,333,800 | B1 | 2/2008 | Gopinath |
| 7,339,914 | B2 | 3/2008 | Bhagwat et al. |
| 7,437,127 | B2 * | 10/2008 | Goren et al. ............... 455/67.11 |
| 7,516,049 | B2 * | 4/2009 | Zill et al. ..................... 702/186 |
| 7,603,710 | B2 * | 10/2009 | Harvey et al. ................... 726/23 |
| 2003/0135762 | A1 | 7/2003 | Macaulay |
| 2005/0058151 | A1 | 3/2005 | Yeh |
| 2005/0169185 | A1 | 8/2005 | Qiu et al. |
| 2005/0190732 | A1 | 9/2005 | Douglas et al. |
| 2005/0201300 | A1 | 9/2005 | Bridgelall |
| 2005/0208952 | A1 | 9/2005 | Dietrich et al. |
| 2005/0254474 | A1 | 11/2005 | Iyer et al. |
| 2005/0276276 | A1 | 12/2005 | Davis |
| 2006/0036406 | A1 | 2/2006 | Skidmore et al. |
| 2006/0068769 | A1 | 3/2006 | Adya et al. |
| 2006/0199558 | A1 | 9/2006 | Chiodini et al. |
| 2006/0224730 | A1 | 10/2006 | Fok et al. |
| 2006/0240840 | A1 | 10/2006 | Morgan et al. |
| 2006/0268906 | A1 | 11/2006 | Kneckt |
| 2006/0270400 | A1 | 11/2006 | DaSilva et al. |
| 2007/0004394 | A1 | 1/2007 | Chu et al. |
| 2008/0004042 | A1 * | 1/2008 | Dietrich et al. ............ 455/456.1 |
| 2008/0008159 | A1 | 1/2008 | Bourlas et al. |

OTHER PUBLICATIONS

Muthukrishnan, et al., "Flavour—Friendly Location-aware Conference Aid with Privacy Observant ArchitectURe" available at least as early as <<Jan. 9, 2007>>, at <<http://wwwhome.cs.utwente.nl~muthukrishnank/papers/00000136.pdf>>, at pp. 1-12.

Muthukrishnan, et al., "Towards Smart Surroundings: Enabling Techniques and Technologies for Localization", available at least as early as <<Jan. 9, 2007>>, at <<http://wwwes.cs.utwente.nl/smartsurroundings/publications/ Muthukrishnan05b.pdf>>, 2007, pp. 13.

Wang, et al., "Solutions to Performance Problems in VoIP Over a 802.11 Wireless LAN," IEEE Transactions on Vehicular Technology, vol. 54, No. 1, Jan. 2005, pp. 366-384.

Xylomenos, et at., "TCP Performance Issues over Wireless Links," IEEE Communications Magazine, Apr. 2001, pp. 52-58.

Yang, et al., "Web Browsing Performance of Wireless Thin-client Computing," Twelfth International World Wide Web Conference (WWW2003), 2003, pp. 1-12.

Bahl, et al., "Enhancing the Security of Corporate Wi-Fi Networks Using DAIR", Mobile Systems, applications and services, 2006, pp. 1-14.

Bulusu, et al., "Self-Configuring Localization Systems: Design and Experimental Evaluation", ACM Transactions on Embedded Computing Systems (TECS), Feb. 2004, vol. 3, No. 1, 34 pgs.

Patwari, et al., "Locating Nodes: Cooperative Localization in Wireless Sensor Networks", IEEE Signal Processing Magazine, vol. 22, No. 4, Jul. 2005, pp. 54-69.

PCT Intl Search Report and Written Opinion for Application No. PCT/US2008/054333, dated Aug. 14, 2008, 9 pgs.

Savvides, et al., "A Self-Configuring Location Discovery System for Smart Environments", Workshop for pervasive computing and networking, 2005, 12 pgs.

Translated the Chinese Office Action mailed Jun. 22, 2011 for Chinese patent application No. 200880005280.8, a counterpart foreign application of U.S. Appl. No. 11/753,536.

Extended European Search Report mailed Nov. 25, 2011 for European patent application No. 08730192.5, 13 pages.

* cited by examiner

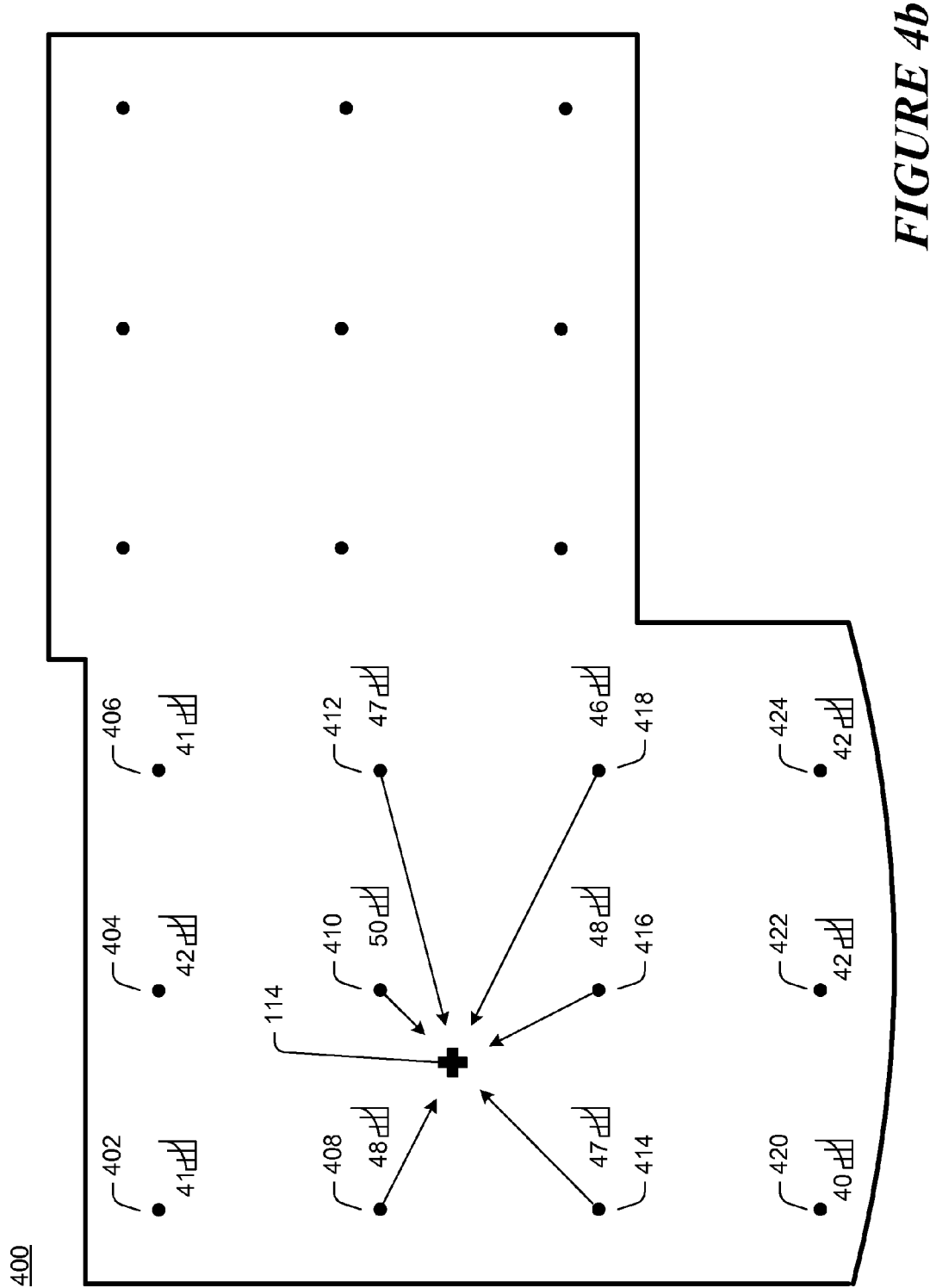

SELF-CONFIGURING WIRELESS NETWORK LOCATION SYSTEM

CROSS REFERENCE TO RELATED MATTERS

This application claims benefit of U.S. provisional application No. 60/890,614 filed on Feb. 19, 2007.

BACKGROUND

Network diagnostics and management are becoming more prominent as the number of networks grows. Industry has primarily focused network diagnostics and management on wired networks in general, and on wide area Internet failures in particular. However, many companies are evolving towards enterprise wireless networks to become more productive. As a result, the problems associated with securing and managing wireless networks have become more prominent.

Industry has provided some commercial offerings in the area of wireless network management using two common approaches. The first common approach is to rely on Access Points (APs) for monitoring wireless networks. The second common approach is to use dedicated and often expensive custom hardware sensors for monitoring the network. The companies that offer products in these areas rarely discuss the mechanisms they use to detect problems. For example, there are many different levels of sophistication that one can provide when solving the security problems of rogue wireless equipment, but companies do not disclose their mechanisms used to implement their solutions.

The approach that relies on APs for monitoring wireless networks is certainly cost effective, but it has several limitations. First, an AP can not easily monitor multiple channels, or associate with other nearby APs, since the AP's primary function requires it to spend most of its time on one specific channel serving associated clients. Second, the APs usually have limited CPU power and memory resources so it is not practical to poll APs (e.g., issued SNMP (Simple Network Management Protocol) queries) too frequently. Third, the level of detail that typical commercial APs provide with their response (i.e., through their SNMP interfaces) is quite limited. Fourth, APs tend to be closed platforms so one cannot load and run third-party code on an AP, making it difficult to quickly deploy new functionality. Finally, an AP only provides a view of one end of the wireless communication, so an AP-based solution can not be used to detect problems such as radio frequency (RF) holes or excessive interference that primarily affect the client end of the communication.

Another common approach of using dedicated hardware sensors for RF monitoring deploys special sensor nodes throughout the wireless network. Industry has also augmented the AP-based monitoring by deploying these special sensor nodes throughout the organization. However, the specialized sensors are quite expensive.

The behavior of the wireless network is dependent on the physical location of the network hardware. Due to the nature of wireless signal propagation, the physical location of both the transmitter and the receiver may have a large influence on the performance observed by end-users. Specifically, the probability of frame loss, and the data rate selected for frame transmission can be impacted by the locations of the transmitter and the receiver. By determining the location of the transmitter, the network administrator can take concrete steps to improve the reliability and performance of their wireless networks.

Many wireless location estimation systems require a mapping step whereby an administrator moves throughout the area being covered by the location system to create a "signal propagation profile" of the environment. This profile needs to be updated at regular intervals to ensure that it reflects the current environmental conditions. Thus, current wireless location estimation systems require significant human administration resources.

SUMMARY

Described herein are, among other things, embodiments of a self-configuring wireless location estimation system. In accordance with one embodiment described herein, wireless adapters are coupled with on one or more computing devices to receive signals from target transceiver devices operating in one or more wireless networks. Such computing devices with wireless adapters are referred to herein as air monitors. The air monitors are generally densely deployed throughout the area in which the system operates. Each air monitor that gathers data about the signal received form the target transceiver devices (e.g. signal strength and device identification data). The data gathered by the air monitors is stored in a data store along with an air monitor identifier corresponding to the air monitor that gathered the data.

The locations of the air monitors either may be known or may be derived from known office locations of users that access the network using the general purpose computer associated with the air monitor. The air monitor location may be stored along with identifying information (e.g. the air monitor's network address) in the data store for later retrieval.

One or more analysis engines (e.g., inference engines) may be deployed in a server and may be in communication with the air monitors. The inference engines may retrieve the stored information from the data store for each of the air monitors to determine a location of the transceiver device by correlating the location of one (or more) of the air monitors with the corresponding retrieved signal strength indication for the target transceiver device as stored by the one (or more) of the air monitors. By using the disclosed embodiment, a location of a target wireless transceiver device may be determined by the inference engine without administration overhead and human intervention. Likewise the location or change in location of any target wireless transceiver device operating into the environment may be quickly determined by the inference engine with minimal human intervention in setup and operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other advantages will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 4a and 4b illustrate the operation of the self-configuring wireless network location system in a representative enterprise environment.

DETAILED DESCRIPTION

Overview

This disclosure is directed to a system that uses a self-configuring wireless network location system for network diagnostics and management. In one embodiment, many wireless transceivers (air monitors) that each have a known predetermined location detect a wireless signal transmitted by a target transceiver device. The wireless transceivers may include a computer which is operated by a user. A signal strength indication value and identification data are determined from the wireless signal by the air monitor and stored in a data store. Known predetermined locations for each of the air monitors are correlated with the transceiver devices' signal strength indication values to determine the transceiver devices' locations.

In another embodiment, the computer is connected to a network. The access information (such as a network access activity, login activity) is monitored to determine the primary user of the computer. The access information fed to the data store. Further the user's office location within the enterprise may also be saved in the data store. The access information and office location may be retrieved by the inference engine to determine the location of the air monitor.

A system having an air monitor and inference engine may simplify deployment of a wireless network location system. Various examples of using the self-configuring wireless network location system to locate a target transmitting devices are described below with reference to FIGS. 1-7.

Example System Architecture

Figure 1:
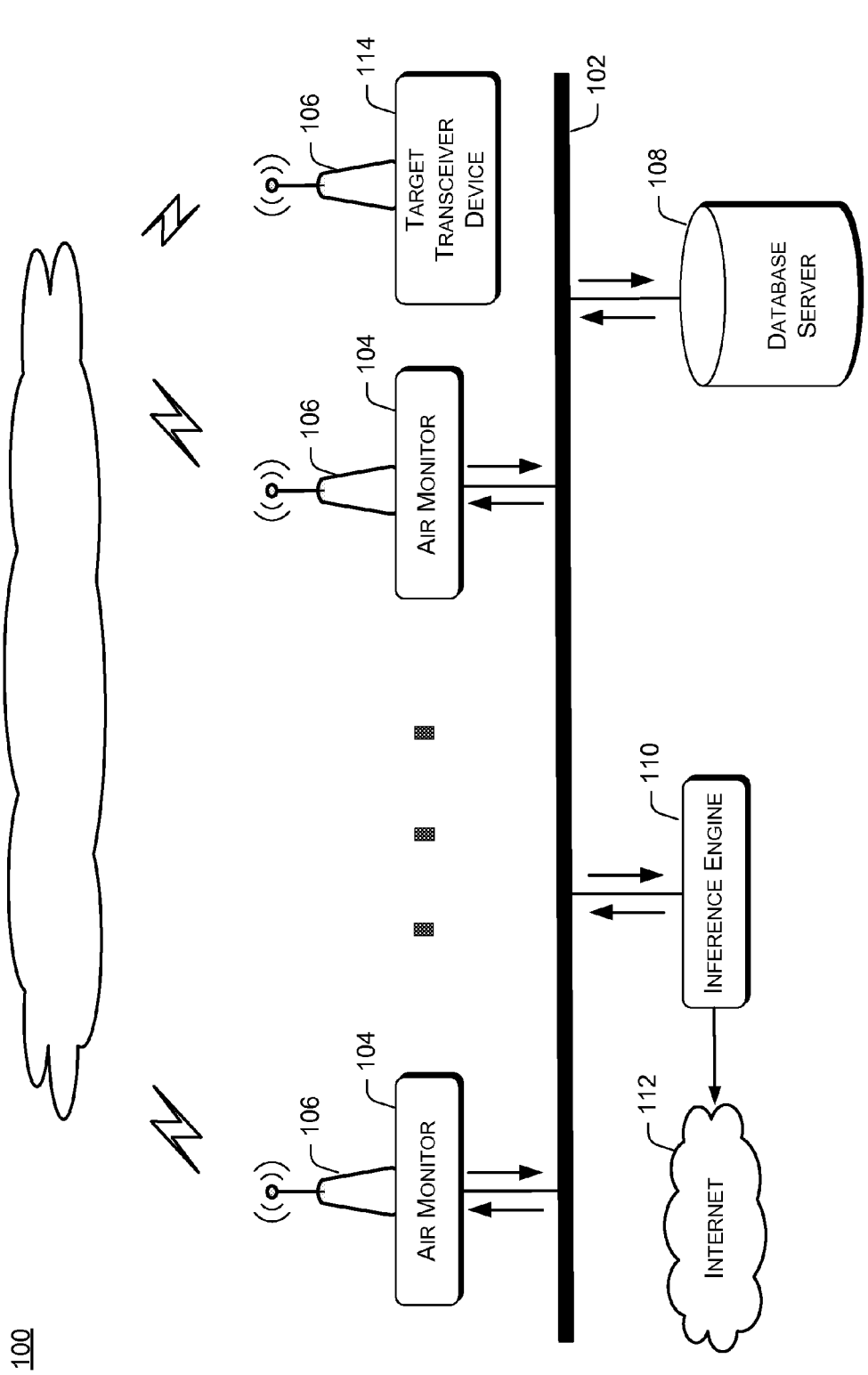
FIG. 1 illustrates an exemplary architecture of a dense array of inexpensive radios (DAIR), in which a self-configuring wireless network location system may be implemented.

FIG. 1 illustrates an exemplary architecture of a dense array of inexpensive radios (DAIR), in which a self-configuring wireless network location system may be implemented. Although a DAIR system is described the techniques described in this disclosure to locate nodes in other types of wireless networks, such as a wireless mesh network. DAIR may allow for wireless management applications to be built that benefit from dense radio frequency (RF) sensing. One such DAIR architecture is described in co-pending U.S. patent application Ser. No. 11/474,652 filed Jun. 26, 2006, entitled "Platform for Enterprise Wireless Applications," the teachings and disclosure of which are hereby incorporated in their entirety by reference thereto.

As discussed in co-pending U.S. Patent Application, DAIR may provide a framework or architecture 100 for detecting and diagnosing faults in wireless networks using existing desktop infrastructure. As shown in FIG. 1, the framework may include a wired network 102, one or more air monitors 104 equipped with wireless adapters 106, a database server 108, and an inference engine 110 that may be connect to the Internet 112. Architecture 100 may be used to detect one or more wireless target transceiver devices 114. Although a wired network 102 is illustrated, the network 102 may be implemented, in one example, as wireless network.

The target transceiver device 114 may be any computing device equipped with a wireless adapter 106. In one embodiment, the air monitors 104 are general purpose desktop computing devices assigned to users (e.g., employees) that are connected to the wired network 102. Although the illustrated air monitor 104 are a desktop PC, and the target transceiver device 114 is a general computing device, the air monitor 104 and transceiver device 114 may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth.

Air monitors 104 may be located at fixed positions in the enterprise environment. The air monitors 104 may cause wireless adapters 106 to operate in "promiscuous" mode to listen continuously, either on a fixed channel, or in scan mode on a sequence of channels. For example, if an air monitors 104 are equipped with a wireless adapter 106 that conforms to the exemplary IEEE 802.11 standard, each air monitor 104 may configure its 802.11 wireless adapter to receive all transmitted 802.11 formatted signals, including those destined for other 802.11 stations such as an access point (not shown). 802.11 formatted wireless signals may contain frames of packetized data, details of which are described herein. Although an exemplary 802.11 standard is disclosed, the techniques may apply to other types of wireless systems, such as cellular wireless networks as well as the standards applicable to that wireless system.

The data received by the air monitors 104 may be stored in a data store, such as, for example, database server 108. Although a database server 108 is shown, data may be stored in other types of memory including, but not limited to, a memory of inference engine 110. Database server 108 may include an interface module (not shown) that enables it to communicate with the inference engine 110 via the wired network 102. The data residing in database server 108 may be analyzed by inference engine 110. Inference engine 110 may also control the air monitors 104 and assign them specific monitoring tasks. Additionally, inference engine 110 may provide data to additional applications via Internet 112.

While database server 108 and inference engine 110 are described in the singular, one will readily appreciate that a plurality of database servers 108 and inference engine 110 may be configured to serve the same function in other embodiments.

Figure 2:
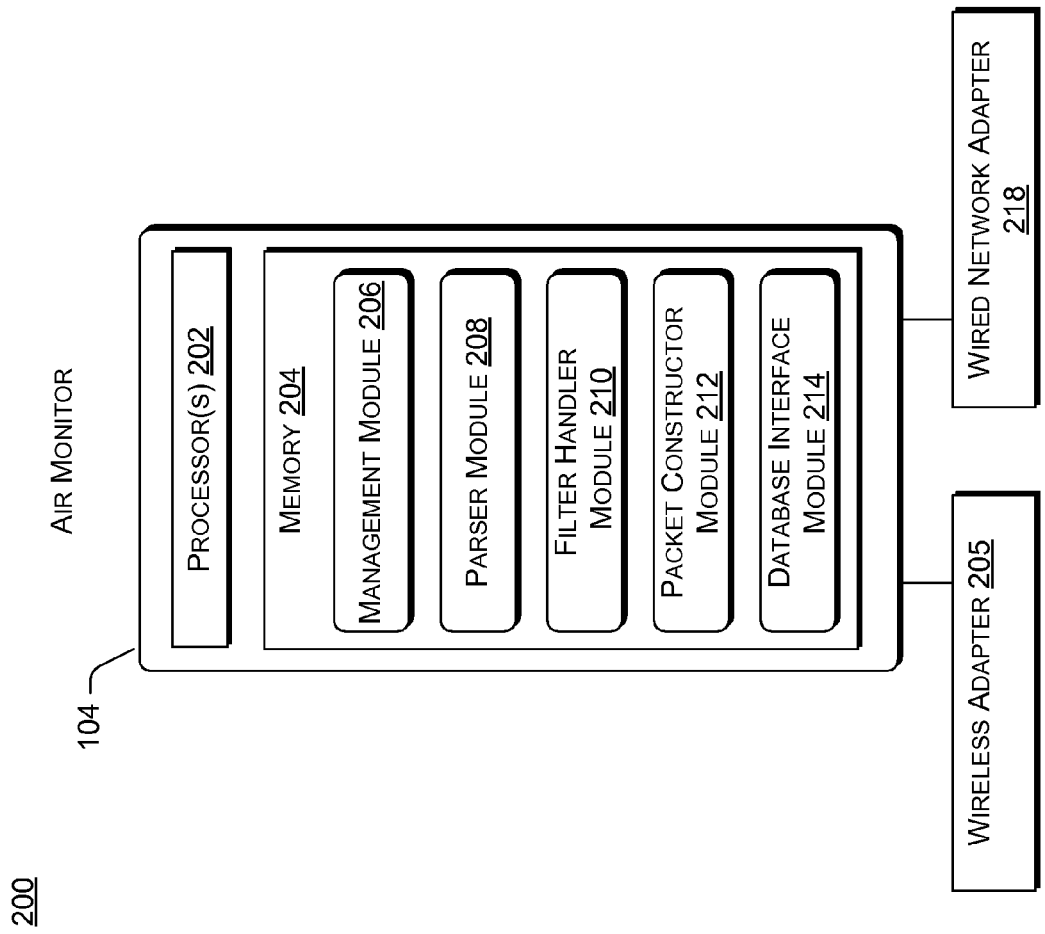
FIG. 2 is a block diagram illustrating selected modules in an air monitor of the self-configuring wireless network location system.

In FIG. 2 there is shown is a block diagram 200 illustrating selected modules in an air monitor 104 of the self-configuring wireless network location system shown in FIG. 1. The air monitor 104 has process capabilities and memory suitable to store and execute computer-executable instructions.

In one example, air monitor 104 includes one or more processors 202 and memory 204. The memory 204 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD- ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

As discussed above, in some embodiments, an air monitor 104 may be a desktop computer that is coupled with an IEEE 802.11 wireless adapter 205. Moreover, in additional embodiments, computing devices other than desktop computers may be employed as air monitors 104, e.g., laptops, personal digital assistants (PDAs), so long as the computing devices are capable of processing and reporting 802.11 formatted data. Such data may include, for example, signal strength, MAC addresses, channels of transmission, and a data rate of the signals provided by a target transceiver device 114.

Stored in memory 204 of the air monitor 104 are management module 206, parser module 208, filter handler module 210, packet constructor module 212, and database interface module 214. These modules may be implemented as software or computer-executable instructions that are executed by the one or more processors 202. Air monitor 104 may also be coupled with a wired network adapter 218.

The memory 204 may contain an operating system (not shown) that may enable the other modules of the air monitor 104 to receive, process, and exchange data. For example, for an air monitor 104 that is a desktop computer, the operating system may include a Microsoft® Windows-based operating system distributed by Microsoft Inc. of Redmond, Wash. In addition, the operating system may also enable air monitor 104 to communicate with other external devices across the wired network 102 via adapter 218.

In embodiments where the air monitor 104 is a desktop computer, management module 206 may collect event history, including types of events, such as local logon events or remote logon events, console lock events, user identification, and time of logons. The management module 206 may be further configured to store this data in records in the database server 108 using database interface module 214 and adapter 218.

The filter handler module 210 may be employed to convert signals received from a target device, such as target transceiver device 114, by extracting packet data embedded within the signals. The filter handler may also be employed to obtain a signal strength indication of the signals and to receive the signals via the wireless adapter 216 and a wireless device driver. Upon reception the signals, the filter handler module 210 may copy the packet data into a buffer along with the signal strength indication. During the conversion, additional information about the received signals, such as the signal's channel and data rate, may be extracted from the received signal and stored with each packet in the buffer.

Additionally, the filter handler module 210 may further employ the parser module 208 to parse, analyze and summarize characteristics of the data stored in the buffer. In this way, the parser module 208 may improve the scalability of the system without imposing an undue CPU burden on the air monitor 104. For example, summaries from the parser module 208 may include a start and an end timestamp, an air monitor identifier, a media control access (MAC) address of the sender, (e.g., target transceiver device 114), a channel on which the signal was received, a number of frames and/or packets sent by a specific transmitter, and a total received signal strength indication (RSSI) of the received signal.

Air monitor 104 feeds information such as the summarized characteristics to database server 108 and in one embodiment may feed the summarized characteristics directly to inference engine 110 via network 102. Packet Constructor module 212 may construct information into packets when air monitor 104 communicates with the inference engine 110 or database server 108 via wire network 102.

The database interface module 214 may be used by the air monitor 104 to transmit the summaries obtained by filter handler module 210 to database server 108 via wired adapter 218. The database interface module 214 may send the summaries at regular intervals. For example, in one embodiment, a summary that includes a MAC address of the target transceiver device, frame timestamp, the target transceiver device's channel of transmission, the frames sent by the target transceiver device, the total RSSI of the signal sent by the target transceiver device, and an identifier of the air monitor providing the summary, may be fed to database server 108 every 90 seconds. These summaries may be stored as individual records within a database within database server 108.

Figure 3:
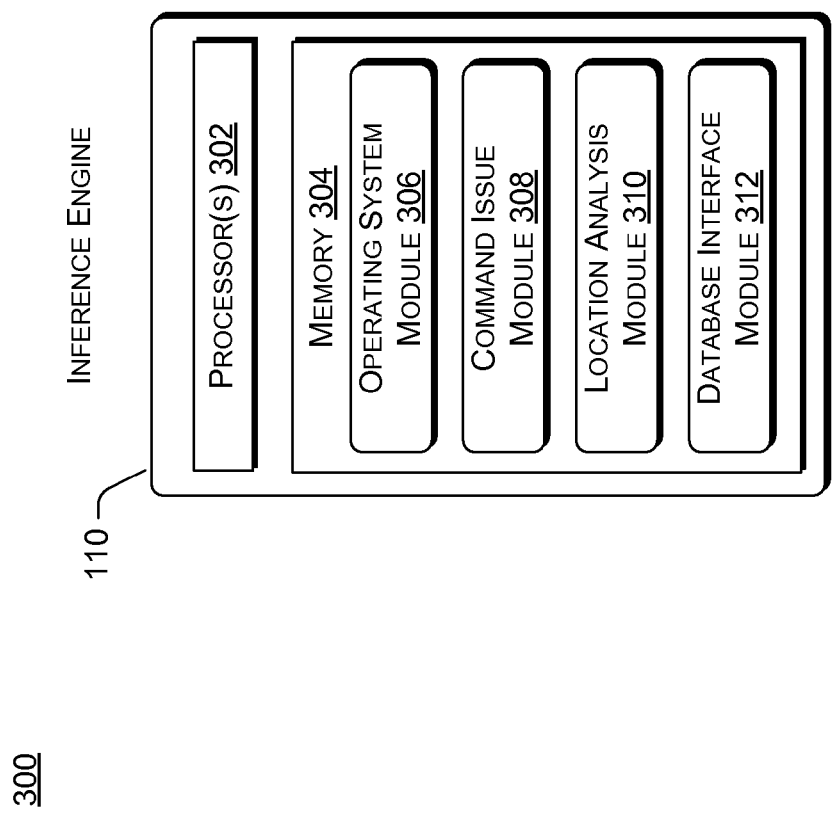
FIG. 3 is a block diagram illustrating selected modules in an inference engine of the self-configuring wireless network location system.

In FIG. 3 there is shown a block diagram 300 illustrating selected modules in an inference engine 110 of the self-configuring wireless network location system. The inference engine 110 may be used to perform computationally intensive analysis tasks associated with determining the location of target transceiver device 114. Specifically inference engine 110 may use the stored summaries of the signals transmitted by a target transceiver device 114 and stored location information of the air monitors 104 stored in server 108 to determine the location of the target transceiver device 114. In some embodiments, the inference engine 110 may be a dedicated computer. However, in other embodiments, the inference engine 110 may reside on an end-user's desktop.

The inference engine 110 has process capabilities and memory suitable to store and execute computer-executable instructions. In this example, inference engine 110 includes one or more processors 302 and memory 304. The memory 304 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 304 are operating system module 306, command issue module 308, location analysis module 310, and database interface module 312. The modules may be implemented as software or computer-executable instructions that are executed by the one or more processors 302.

The operating system module 306 contains an operating system that may enable the other modules of the inference engine 110 to receive, process, and exchange data. In addition, the operating system module 306 may also enable inference engine 110 to communicate with other devices across wired network 102. For example, an inference engine 110 may be based on a desktop computer. The operating system module 306 may include a Microsoft® Windows-based operating, produced by Microsoft Inc of Redmond, Wash.

The command issue module 308 may enable the inference engine 110 to issue new commands to one or more air monitors 104. For example, the inference engine 110 may use the command issue module 308 to submit a request to air monitors 104 that result in the one or more air monitors 104 monitoring a channel that is different from the current channel being monitored. The command issue module 308 may also issue a request to have air monitors 104 begin monitoring user logins.

The inference engine 110 may employ the database interface module 312 to retrieve packet summaries from records within database server 108 via the wired network 102. Typically, the inference engine 110 may retrieve new summaries stored by each of the air monitors 104 by issuing periodic queries to the database server 108 via database interface module 312.

The inference engine 110 may use the location analysis module 310 to locate a target transceiver device 114. In one embodiment, the location analysis module 310 automatically determines the physical location of the air monitors 104. For example, in an enterprise environment where the air monitors 104 are end-user desktops, the location of each air monitor 104 may be determined with respect to the office where the air monitor 104 is placed.

Specifically, in one embodiment, the location analysis module 310 may activate the database interface module 312 to retrieve, from database server 108, the login histories of desktop machines that act as air monitors 104. Once the login histories are retrieved, the location analysis module 310 may analyze the login history of each desktop machine to determine the desktop machine's primary user. The determination of the primary user of a desktop machine may begin with the examination of the system event log for user login and console lock events. Typically, remote login events and non-console unlock events are ignored. This examination may enable the extraction of user identifiers from local events. Moreover, the location analysis module 310 may be configured to determine that the user with the most logins and unlock events in a given time period is the primary user.

Once the primary user is determined for each desktop machine (i.e., air monitor 104), the location analysis module 310 may then consult a database of users and office numbers in database server 108. Using this database, the location analysis module 310 may match one or more primary users to office numbers. The location analysis module 310 may then use one or more scale maps to determine the approximate graphical coordinate of each office that is associated with a primary user. This process may enable the location analysis module 310 to determine the approximate physical location of each air monitor 104.

For example, in one specific embodiment, the location analysis module 310 may, using database interface module 312, access from the database an online-scale building map in Visio extensible markup language (XML) format. The map includes labels for office numbers, which are centered within each office. The location analysis module 310 may parse the XML, determine the graphical coordinates of each label, and convert these coordinates to physical coordinates that may then be stored in a database within server 108. This procedure provides an estimate of the center of each office. By combining this information with data from a user-to-office number table stored in database, the location analysis module may automatically determine the location of each air monitor 104. Nevertheless, in further embodiments, other forms of office map information may be combined with user-to-office data to ascertain the location of each air monitor 104. For example, the location analysis module 310 may employ scale maps that include the actual map coordinates of each air monitor 104.

When the location analysis module 310 has determined the physical locations of the air monitors 104, it may then determine the location of the target transceiver device 114. In one embodiment, the location analysis module 310 may use a Nearest Air Monitor (AM) method to locate the target transceiver device 114. In this embodiment, the analysis module 312 receives RSSI data for a given target transceiver device 114 from a record in database server 108 for each of the air monitors 104. Analysis module is able to determine records pertaining to a given target transceiver device 114 because an identifier of that device 114 is stored in the data base record with the RSSI data and a timestamp. Analysis module 310 computes the average RSSI seen by each air monitor 104 during a specified time period. In one example the specified time period may be about 30 seconds. In other examples the specified time period may be based on a number of packets (e.g. 100). The location analysis module 310 then determines the air monitor 104 that observed the highest average RSSI for a given transceiver device 114 during this period, and reports (such as by storing in database server 108) this air monitor's location as the location of the target transceiver device 114. It will be appreciated that the accuracy of the Strongest AM method may improve as the density of the air monitors 104 increases.

In another embodiment, the location analysis module 310 may use a Centroid method to determine the location of the target transceiver device 114. In this embodiment, the location analysis module 310, using data retrieved from database server 108, determines a set of all air monitors 104 whose average RSSI for a given transceiver device 114 within a specified time period is less than a predetermined amount (for example 15%) of the average RSSI of the nearest air monitor 104 to the target transceiver device 114. In one embodiment the air monitor 104 that observed a highest average RSSI during the specified time period may be designated to be the nearest air monitor 104. The location analysis module 310, using the coordinates of the determined set of air monitors 104, designates the location of the target transceiver 114 as a geographic center of the set of the air monitors 104. An example implementation of the Centroid method is described in reference to FIG. 4a.

In another embodiment, the location analysis module 310 may use a "ball and spring" method to determine the location of the target transceiver device 114 using air monitors 104.

Figure 4A:
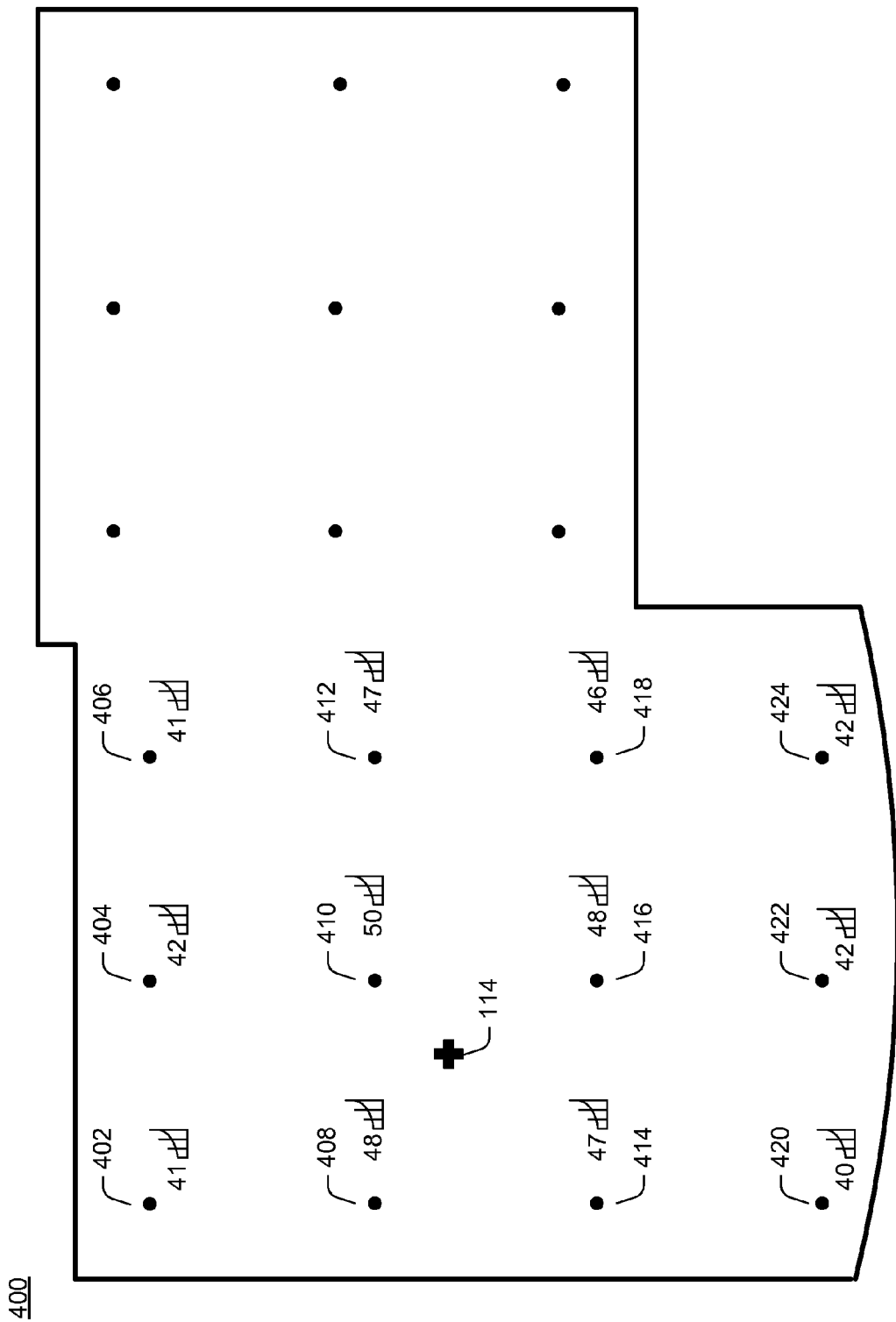

FIG. 4a and 4b illustrate the operation of the self-configuring wireless network location system in a representative enterprise environment. Specifically, as described above, FIG. 4a illustrates the Centroid method, for determining the location of target transceiver device 114 using air monitors 104. FIG. 4a shows an enterprise environment 400. The enterprise environment 400 is equipped with enterprise air monitors 402-424. A target transceiver device 114 is located in the enterprise environment 400.

Using the Centroid method, enterprise air monitor 410 may be designated as the air monitor closest to target transceiver device 114 having, for example, an RSSI of 50. An exemplary set of air monitors having a RSSI less than 15% of the designated air monitor 410 would be determined (e.g. air monitors having an average RSSI greater than 42.5). In this example the set of air monitors would be air monitors 408-418. The location for the target transceiver device 114 would be positioned in the geographic center of air monitors 408-418.

The "ball and spring" method is described below with respect to FIG. 4a and 4b. FIG. 4a and 4b show an enterprise environment 400. The spring-and-ball method uses a "profile" of an area, such as enterprise environment 400, in which the air monitors 402-424 are deployed. A profile is an approximate, compact representation of how the signal strength degrades with distance in the local environment. The location analysis module 310 may generate a profile by using the command issue module 308 to activate each of the air monitors 402-424 to broadcast special probe packets at regular intervals, wherein the probe packets contain the identity for each of the transmitting air monitors 402-424.

Each of the air monitors 402-424 record these probe packets from the other air monitors 402-424 and report the average signal strength of packets heard from each of air monitors 402-424 to a central database. Further such report of the average signal strength of packets heard from each of air monitors may be plotted as points on a 2-dimensional graph. The graph may have the average observed RSSI between air monitors as one axis and the known distance between two air monitors as the other axis. The location analysis module 310 may fit a set of simple curves to the graph, and picks the curve with the best fit as the profile for the enterprise.

The resulting profile is labeled with the channel on which the probe packets were sent and stored in the database server 108 via database interface module 312. Many such profiles for different channels, different times of day, and different power levels may be generated and stored in server 108. The profiles may be periodically regenerated. When the location analysis module 310 attempts to locate a target transceiver device 114, it determines the average signal strength that each of the air monitors 402-424 observed for the target transceiver device 114. For example, FIGS. 4a and 4b shows the observed signal strength for device 114 at each of the air monitors 402-424. Specifically, air monitor 402 observed average signal strength of 41 emanating from the target transceiver device 114, air monitor 404 observed average signal strength of 42, air monitor 406 observed average signal strength of 41, and so on. From these observed signal strengths, the location analysis module 310 calculates the initial estimate of the location using the Centroid method. The location analysis module 310 may then refine the estimate using the "spring-and-ball" method.

In one embodiment, the location analysis module 310 first uses the database interface module 312 to retrieve the most recent enterprise profile from database server 108 that matches the frequency band of the channel on which the signals from device 114 were heard. Details of determining the enterprise profile is described in FIG. 8. Using the profile, the location analysis module then determines the signal strength that each of the air monitors 402-424 should have observed had the target transceiver device 114 been at the initial estimate of the location. In one embodiment this determination is performed for an air monitor by using the enterprise profile to calculate the signal strength corresponding to a distance between the air monitor and the initial estimated location of the target device 114. In one example, although not limited to this example, the calculated signal strength is selected to correspond to a point on the profile curve corresponding to the distance. The location analysis module 310 then considers the difference between the calculated signal strength at each of the air monitors 402-424 and the signal strengths actually observed at each of the air monitors 402-424. If the air monitor did not receive any packets from the target device, that air monitor is excluded from consideration.

As shown in FIG. 4b, the absolute value of the difference between the calculated signal strength and the signal strength that each of air monitors 408-418 observed may correspond to the magnitude of the force on the corresponding imaginary "springs" (as indicated by arrows) that "connects" the target transceiver device 114 to the particular air monitors 408-418.

The direction of the force (not shown) is along the line connecting the location of the air monitor 428 and estimated location of the target transceiver device 114. Accordingly, the location analysis module 310 may then move the estimated location of the target transceiver device 114 a short distance in the direction of the cumulative force. In this way, the location analysis module 310 may reduce the magnitude of the error by a small amount and produce a new estimated location of the target transceiver device 114. The location analysis module 310 may then recalculate the forces at this new location, and repeat the process until the magnitude of the error falls below a threshold or a certain number of iterations have elapsed. In this way, location analysis module 310 can determine the location of the target transceiver device 114 using the "spring-and-ball" method.

Exemplary Process

Figure 5:
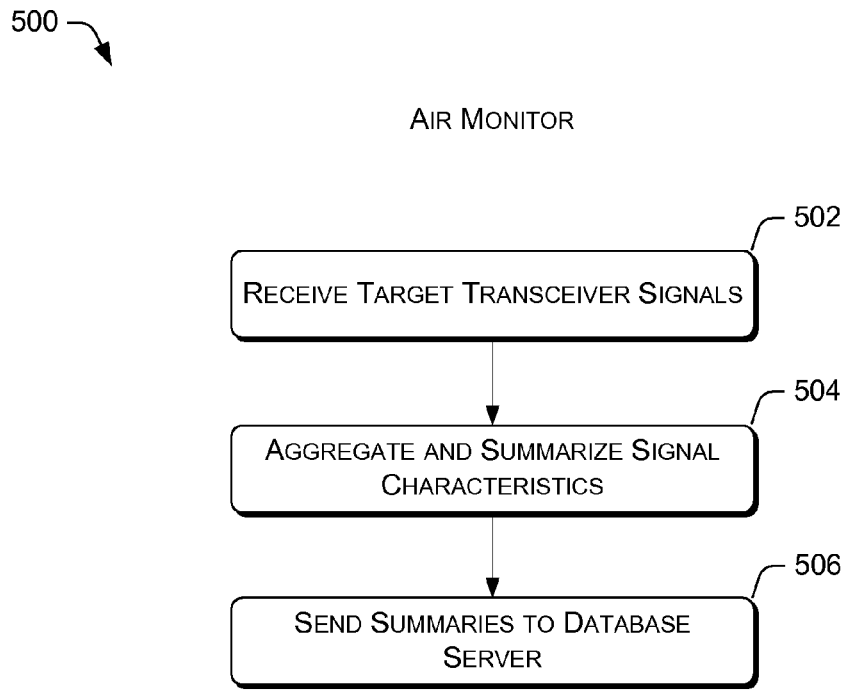
FIG. 5 illustrates a flow diagram of an exemplary process used by an air monitor of the self-configuring wireless network location system to obtain target device characteristics.
Figure 6:
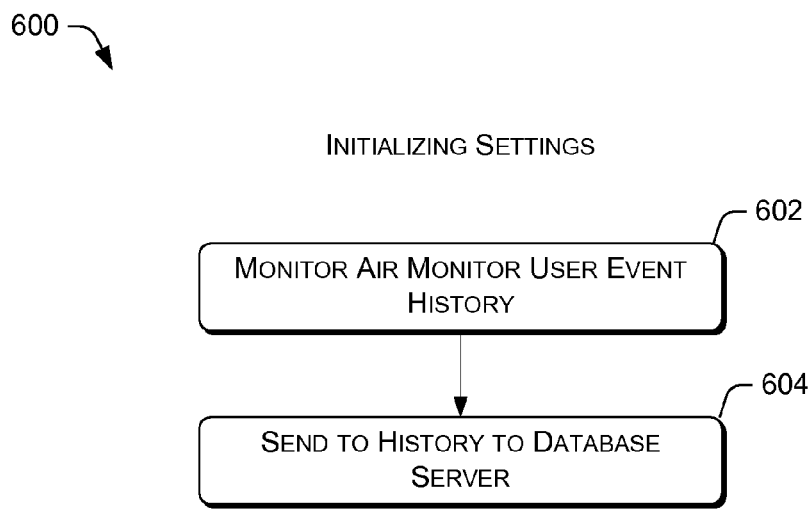
FIG. 6 illustrates a flow diagram of an exemplary process used by an air monitor to provide initialization data to an inference engine.
Figure 7:
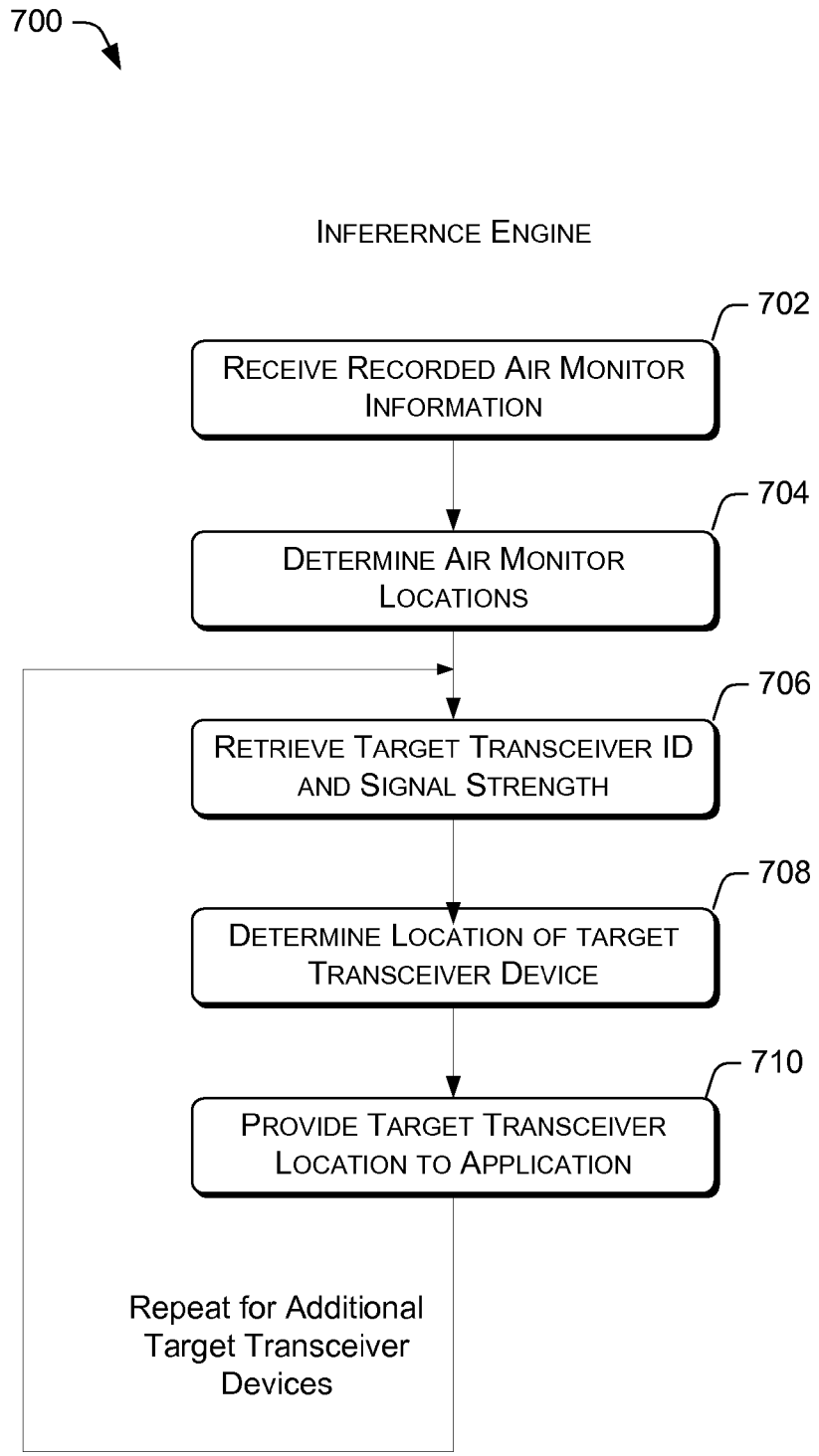
FIG. 7 illustrates a flow diagram of an exemplary process used by the inference engine for determining the location of target transceiver device using the self-configuring wireless network location system.

The exemplary processes in FIGS. 5-7 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to system 100 of FIG. 1, although it may be implemented in other system architectures.

FIG. 5 illustrates a flow diagram of an exemplary process 500 used by an air monitor 104 to obtain information contained in or relating to signals transmitted by a target transceiver device. Such information can be used by inference engine 110 to determine the location of the target transceiver device 114.

At block 502, an air monitor 104 receives signals from a target transceiver device 114 and may employ filter handler module 210 to extract packet data from the received signals. Characteristics of the received signals may also be extracted from the packet data. Such characteristics may include the data rate, the start and an end timestamp, a media control access (MAC) address of the sender, (e.g., target transceiver device 114), a channel on which the signal was received, a number of frames and/or packets sent by a specific transmitter, and a total received signal strength indication (RSSI) of the received signal.

At block 504, the filter handler module 210 may use the parser module 208 to aggregate the target transceiver device signal characteristics. The parser module 208 may produce summaries of the target device signal characteristics along with an identifier for the air monitor that received the signal. At block 506, the air monitor 104 may, using the database interface module 214, send the summaries to database server 108 via the wired network.

FIG. 6 illustrates a flow diagram of an exemplary process 600 used by one of the air monitors 104 of the self-configuring wireless network location system, as shown in FIG. 1, to provide initialization data to inference engine 110 so that inference engine 110 can determine the locations of air monitors 104. Process 600 may be initiated upon a request from inference engine 110, on power-on or may be set to periodically and automatically execute. At block 602, air monitor 104 may collect event or access history of the computer in which the air monitor process resides using management module 206. Examples of event history include different types of events, such as local logon events or remote logon events, console lock events, user identification supplied during logons or console events, and the time of the user logons.

At block 604, the air monitor 104 may store this data in the database server 108 using database interface module 214.

FIG. 7 illustrates a flow diagram of an exemplary process 700 for determining the location of target device using the self-configuring wireless network location system shown in FIG. 1. At block 702, the inference engine 110 uses the database interface module 312 to receive recorded air monitor information previously stored in database server 108 as described in FIG. 6. At block 704, the inference engine 110 may use the location analysis module 310 and the recorded air monitor information to determine locations of the air monitors 104 as described in FIG. 3. For air monitors 104 that include desktop or fixed location computers, the location analysis module 310 in inference engine 110 may ascertain the location of an air monitor 104 by determining the computer's primary user. The primary user then may be correlated to a specific location (e.g., office) or graphical coordinates on a scale representation such as a map.

At block 706, the location analysis module 310 may cause database interface module 312 to retrieve from database server 108 an identifier (e.g. a MAC address) of a target transceiver device 114 and its corresponding signal strength observed at each of the air monitors 104. At block 708, the location analysis module 310 may determine the location of the target transceiver device 114 using one of the Strongest AM method, the Centroid method, and the "spring-and-ball" method. When determining the location of the transceiver device using the "spring-and-ball" method, the exemplary process described in FIG. 8 may be used. At block 710, the inference engine 110 may provide the location (or graphical coordinates) of the target transceiver device 114 to an application. For example, the location of the target transceiver device 114 may be provided to a performance tracker application that aggregates statistics about devices based on location. Finally, process 700 may return to block 706 where the steps in block 706-710 are repeated for other target transceiver devices to determine the location of such other target transceiver devices 114 of interest.

Figure 8:
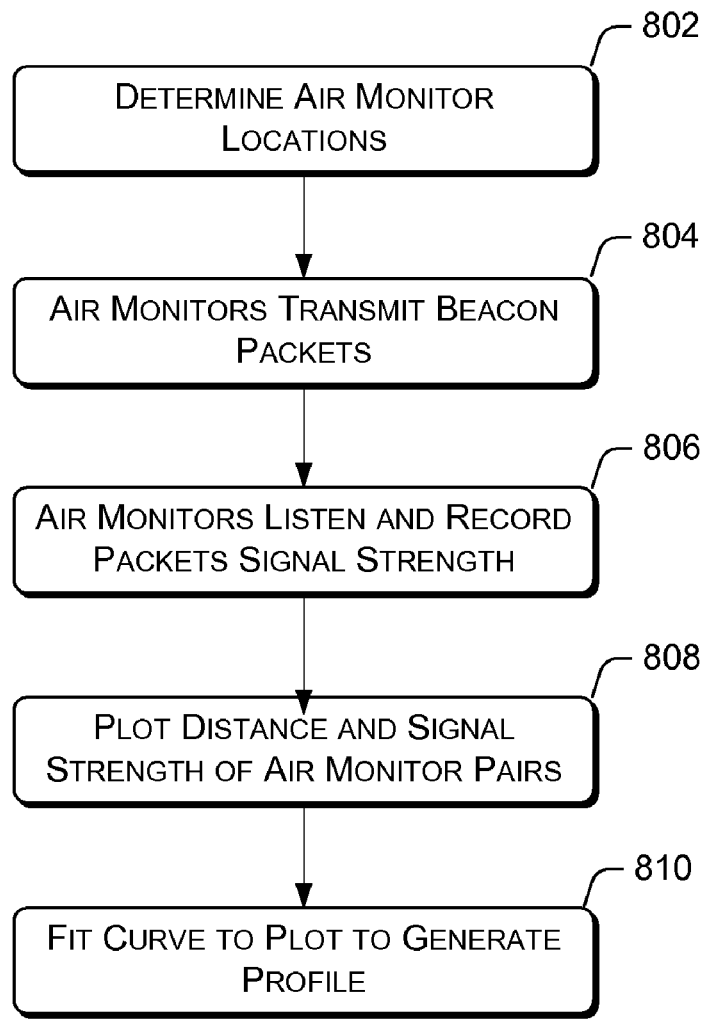
FIG. 8 illustrates a flow diagram of an exemplary process used by the inference engine for determining a network profile used to determine the location of target transceiver device.

Illustrated in FIG. 8 is a process that may be used by the inference engine to generate a signal strength vs. distance profile for the enterprise. The locations of the Air Monitor are determined by the engine in block 802 using the method previously described. In turn each air monitor 104 is fed a command using commend issue module 308 to send out a number of indicator packets in block 804. In block 806 each of the other air monitors listen and record the signal strength of these packets which may be stored in data base server 108. After the packets are received, inference engine analyzes each pair of air monitors and would plot points corresponding to a distance and signal strength of air monitor pairs on a graph in block 808 for all air monitor pairs. In block 810 these points would be fitted to a curve to generate a profile.

For example, in examining exemplary air monitors A and B, the distance between the monitors may be known (exemplary distance d). The signal strength of air monitors A's transmission as seen by air monitor B (exemplary strength S1) and of air monitor B's transmissions, as seen by air monitor A (exemplary strength S2) would be retrieved from the server 108. These pair of air monitors would have two data points: (d, S1) (d, S2). These data points would be computed for all air monitor pairs would be plotted as points on a graph, with distance on X axis and signal strength on Y axis. A curve would then be fit to these points as the environment profile.

CONCLUSION

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
receiving a wireless signal transmitted by a transceiver device;
storing a signal strength indication for the received wireless signal;
determining a location of each one of a plurality of air monitors; and
determining a location of the transceiver device by correlating the determined location of one of the plurality of air monitors with a corresponding retrieved signal strength indication for the transceiver device, the correlating comprising:
commanding each of the plurality of air monitors to broadcast a probe signal;
storing, by each of the plurality of air monitors, probe signal strength indicators of received probe signals transmitted by each other of the plurality of air monitors; and
generating a profile based on the probe signal strength indicators and the determined locations of each of the plurality of air monitors.

2. The method as recited in claim 1 wherein the signal strength indication is stored in a data store, and wherein the method further comprises retrieving the stored signal strength indication from the data store, and wherein the determined location of the transceiver device is determined using the corresponding strongest retrieved signal strength indication for the transceiver device.

3. The method as recited in claim 2 wherein the wireless signal is received by the plurality of air monitors, and wherein the signal strength indication is stored in the data store by the plurality of air monitors.

4. The method as recited in claim 2 further comprising:
deriving from the wireless signal by each of the air monitors an address of the transceiver device;
storing in the data store with each of the air monitors the address of the transceiver device along with the signal strength indication; and
wherein the determining a location of the transceiver device includes receiving from each of the air monitors the address of the transceiver device.

5. The method as recited in claim 1, wherein at least one air monitor includes a computer, wherein a user accesses a network with that computer, and determining the location of the at least one air monitor comprises:
monitoring an access history by the user of the computer, the access history comprising a logon to the computer by the user;
identifying in the data store a record containing a pre-assigned location of the user based on the access history;
associating the pre-assigned location with the at least one air monitor; and
storing physical coordinates for the pre-assigned location in the data store as the location of the at least one air monitor.

6. The method as recited in claim 1 further comprising automatically generating a map identifying the location of the air monitors and the transceiver device.

7. The method as recited in claim 1, wherein determining the location of the transceiver device by correlating the determined location of one of the plurality of air monitors with the corresponding retrieved signal strength indication for the transceiver device comprises:

determining relationships in an enterprise environment between a distance between air monitors and the strength of signals received by each of the air monitors;

setting an initial location of the transceiver device based on the signal strength of the signal from the transceiver device as indicated by a some of the plurality of air monitors; and adjusting the initial location using the determined relationship.

8. The method as recited in claim 7 wherein determining relationships comprises generating a curve corresponding to the determined relationships in the enterprise environment; and wherein adjusting the initial location comprises setting a distance between the air monitor and the transceiver device based on an intersection of the corresponding signal strength for the air monitor as received from the transceiver and the curve, and modifying the initial location using the set distance.

9. The method as recited in claim 1, wherein determining a location of the transceiver device by correlating the determined location of one of the plurality of air monitors with the corresponding retrieved signal strength indication for the transceiver device comprises:

obtaining signal strength for the wireless signal from the transceiver device as received by the plurality of air monitors;

selecting some of the plurality of air monitors as air monitors indicating a signal strength for the transceiver device as a predetermined amount of a maximum signal strength for the transceiver device for all the air monitors;

determining a geographic center point of the some of the plurality of air monitors; and setting the location of the transceiver device as the geographic center point of the some of the plurality of air monitors.

10. The method as recited in claim 1 further comprising using an inference engine in a server for the retrieving and determining a location of the transceiver device.

11. The method as recited in claim 1 wherein said signal complies with IEEE 802.11 format, and wherein said air monitors include a wireless network circuit coupled with a computer device.

12. A system comprising:

a plurality of transceiver devices configured to each transmit a wireless signal including an identifier of the source of the signal;

a plurality of air monitors to receive the wireless signal and to store the identifier and a signal strength indication of the wireless signal transmitted by one or more of the plurality of transceiver devices; and an inference engine to receive the identifier and the corresponding signal strength, to retrieve a predetermined location for each of the air monitors, and to determine a physical location of the transceiver device by correlating the retrieved location with the signal strength indications, the correlating comprising:

storing, by each of the plurality of air monitors, probe signal strength indicators of received probe signals transmitted by each other of the plurality of air monitors; and generating a profile based on the probe signal strength indicators and the predetermined location for each of the air monitors.

13. The system as recited in claim 12 wherein the air monitors derive from the wireless signal an address of one or more of the transceiver devices, wherein the air monitors store in a data store the address of the transceiver devices along with a corresponding signal strength indication for the transceiver devices; and wherein the inference engine determines the locations of the transceiver devices after retrieving the address of the transceiver devices.

14. The system as recited in claim 12 wherein the air monitors are located at fixed physical locations, and wherein the physical locations are stored in a data store.

15. A computer readable medium comprising computer-executable instructions that, when executed by one or more processors, perform acts comprising:

storing locations of a plurality of air monitors that each are operable to receive a wireless signal transmitted by a transceiver device and store in records in a data store a signal strength of the signal along with identification data identifying the transceiver device that transmitted the signal;

retrieving from the data store the stored signal strength indications for records with the same identification data; and determining a location of the transceiver device as a function of the determined locations of the plurality of air monitors and the retrieved signal strength indications, the determining a location of the transceiver device comprising generating a profile based on:

probe signals transmitted and received by each of the plurality of air monitors; and the locations of the plurality of air monitors.

16. The computer readable medium as recited in claim 15 wherein the wireless signal is received with the plurality of air monitors, and wherein the signal strength indication is stored in the data store by the plurality of air monitors.

17. The computer readable medium as recited in claim 15 further comprising:

deriving from the wireless signal by each of the air monitors an address of the transmitting devices;

storing in the data store with each of the air monitors the addresses of the transceiver devices along with their signal strength indications; and wherein the determining of a location of the transceiver devices include receiving from each of the air monitors the addresses of the transceiver devices.

18. The computer readable medium as recited in claim 15, wherein at least one air monitor comprises a computer, wherein a user accesses a network with the computer, and determining the location of the at least one air monitor comprises:

monitoring an access history by the user of the computer, the access history comprising a logon to the computer by the user;

identifying in the data store a record containing a pre-assigned location of the user based on the access history;

associating the pre-assigned office location with the at least one air monitor; and storing physical coordinates for the pre-assigned location in the data store as the location of the at least one air monitor.

19. The computer readable medium as recited in claim 15 wherein determining a location of the transceiver device as a function of the determined locations of the plurality of air monitors and the retrieved signal strength indications further comprises:

obtaining signal strengths for the signal from one of the transceiver devices from some of the plurality of air monitors; and setting the location of the one of the transceiver devices as a geographic center point of the some of the plurality of air monitors.

20. A method comprising:

receiving a wireless signal transmitted by a transceiver device;

storing a signal strength indication for the received wireless signal;

determining a location of each one of a plurality of air monitors; and determining a location of the transceiver device by correlating the determined location of one of the plurality of air monitors with a corresponding signal strength indication for the transceiver device comprising:

receiving instructions via a network by each of the plurality of air monitors to broadcast probe packets;

recording probe packets from each broadcasting air monitor by each of the plurality of air monitors;

determining, by each of the plurality of air monitors, a signal strength of packets received from each broadcasting air monitor;

reporting, by each of the plurality of air monitors, the signal strength for each other of the plurality of air monitors;

fitting a set of curves between points associated with distance and signal strength for each of the plurality of air monitors;

selecting a curve from the set of curves with the best fit between the points to create a profile for an enterprise environment of the plurality of air monitors;

setting an initial location of the transceiver device based on the signal strength of the signal from the transceiver device as indicated by some of the plurality of air monitors;

selecting the one of the plurality of air monitors that has the strongest retrieved signal strength indication for the transceiver device; and adjusting the initial location to minimize an error by setting a distance between the one of the plurality of air monitors and the transceiver device based on an intersection of the corresponding signal strength for the air monitor as received from the transceiver device and the curve, and modifying the initial location using the set distance, wherein the error is the difference between a signal strength indication that the some of the plurality of air monitors received from the transceiver device and an estimate of a signal strength indication that the some of the plurality of air monitors were estimated to have received from the transceiver device as determined from an evaluation of the curve associated with the profile.

* * * * *